United States Patent [19]

Moon et al.

[11] Patent Number: 5,666,458

[45] Date of Patent: Sep. 9, 1997

[54] REPRODUCTION ERROR CORRECTION CIRCUIT FOR A VIDEO REPRODUCTION SYSTEM, AND THE METHOD FOR OPERATING IT

[75] Inventors: Byung-joon Moon, Kyungki-do; Sung-il Cho, Incheon; Ki-ho Shin, Kyungki-do, all of Rep. of Korea

[73] Assignee: Samsung Electronics Co., Ltd., Suwon, Rep. of Korea

[21] Appl. No.: 667,169

[22] Filed: Jun. 20, 1996

Related U.S. Application Data

[63] Continuation of Ser. No. 280,770, Jul. 26, 1994, Pat. No. 5,587,804.

[30] Foreign Application Priority Data

Jul. 28, 1993 [KR] Rep. of Korea ............... 93-14473

[51] Int. Cl.⁶ ............... H04N 9/89; H04N 5/95; H04N 5/78; H04N 9/88
[52] U.S. Cl. ............... 386/2; 386/20; 386/47; 386/40; 386/41
[58] Field of Search ............... 386/13, 20, 2, 386/3, 41, 47, 49–50, 85, 90–91; 348/617, 498; H04N 5/76, 5/78

[56] References Cited

U.S. PATENT DOCUMENTS

| | | | |
|---|---|---|---|
| 4,287,529 | 9/1981 | Tatami et al. | 358/8 |
| 4,392,159 | 7/1983 | Lemoine et al. | 358/319 |
| 5,245,430 | 9/1993 | Nishimura | 358/149 |

*Primary Examiner*—Tommy P. Chin
*Assistant Examiner*—David R. Vincent
*Attorney, Agent, or Firm*—Allen LeRoy Limberg

[57] ABSTRACT

A reproduction error correction circuit for a video reproduction system includes a line-storage memory for temporarily storing composite video signal samples, which memory is operated to provide both for time-base correction and for drop-out compensation. The memory is cyclically supplied sequential write addresses descriptive of pixel locations along a horizontal scan line, generated at a rate that tracks any jitter in the input video signal selectively used for writing over the previous contents of the memory. The memory is cyclically supplied sequential read addresses offset ½ scan line from the write addresses, generated at a stable rate equal to an average over several scan lines of the rate at which write addresses are generated. This provides for time-base error correction. When a drop-out is detected, overwriting of video signal samples already stored in the single line-storage memory is prohibited. This type of overwrite protection implements automatic replacement of the video signal during periods when drop-out is detected. The phase of the chrominance signal component of the delayed video used for drop-out compensation is adjusted, however, when necessary, to correspond to that required in the replacement signal.

6 Claims, 5 Drawing Sheets

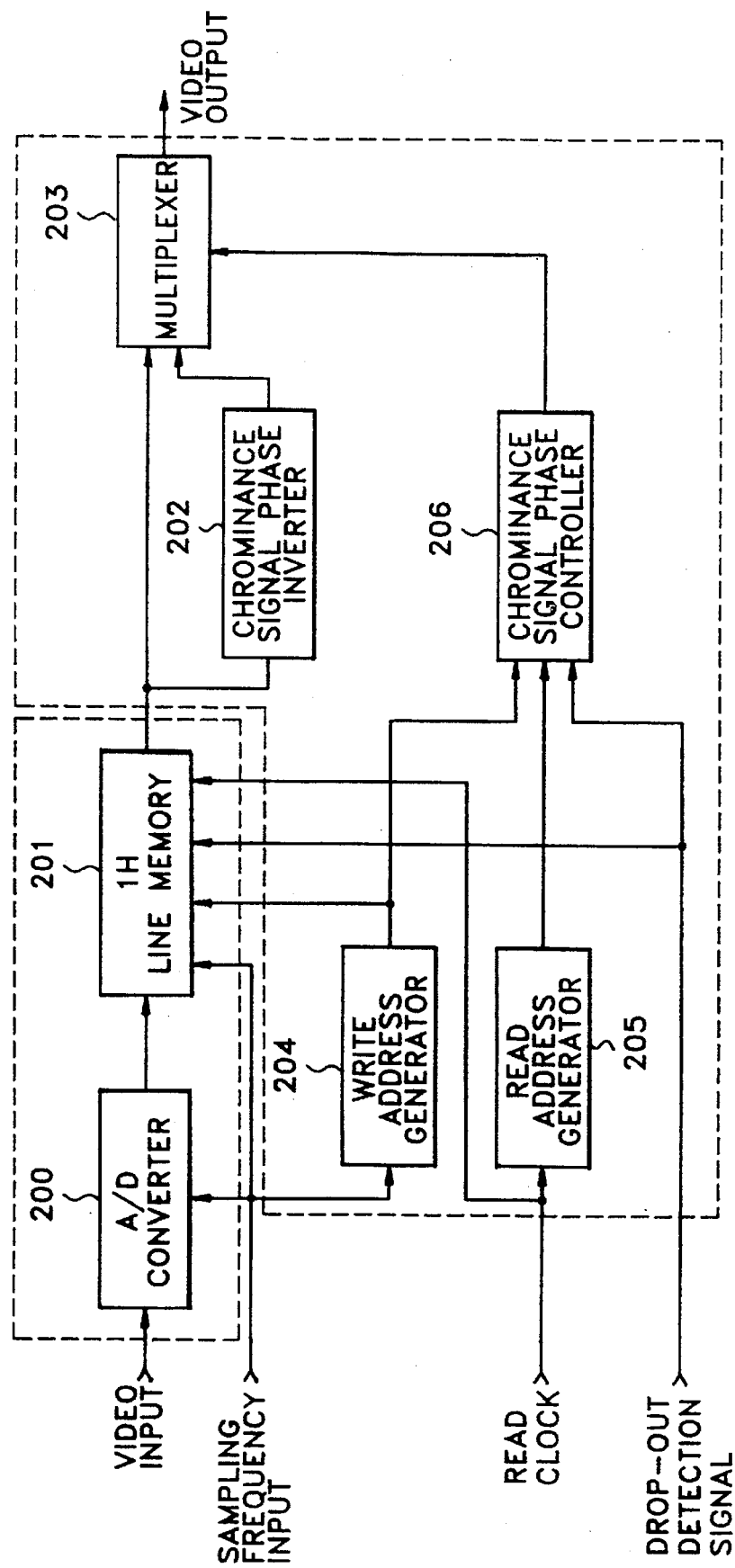

x ; PHASE INVERTED x ; PHASE INVERTED x ; PHASE INVERTED
o ; PHASE MAINTAINED

FIG. 4
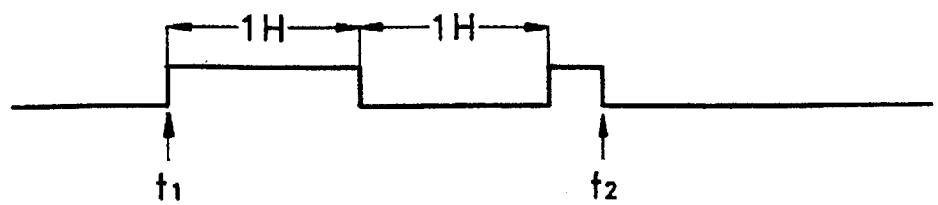
FIG. 5
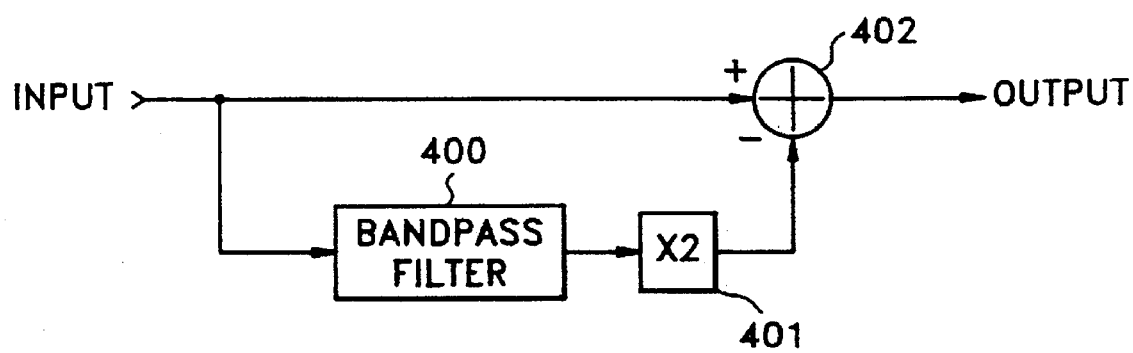
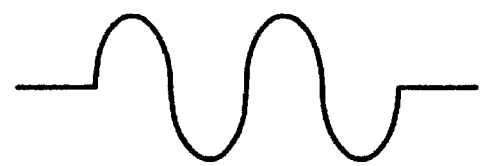
FIG. 6A
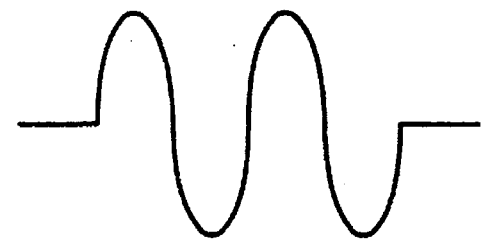
FIG. 6B
FIG. 6C

REPRODUCTION ERROR CORRECTION CIRCUIT FOR A VIDEO REPRODUCTION SYSTEM, AND THE METHOD FOR OPERATING IT

This is a continuation of application Ser. No. 08/280,770 filed Jul. 26, 1994 now U.S. Pat. No. 5,587,804.

BACKGROUND OF THE INVENTION

The present invention relates to a video reproduction system, and more particularly, to a reproduction error correction circuit for a video reproduction system and the method therefor.

FIG. 1 is a block diagram of the reproduction error correction circuit for a conventional video reproduction system. In FIG. 1 the reproduction error correction circuit comprises a time base error correction unit 10 composed of an analog-to-digital (A/D) converter 100 and a first-in-first-out (FIFO) memory 101, and a drop-out compensation unit 20 composed of a one horizontal line (1H) delay 102 and a chromatic signal phase corrector 103.

The horizontal synchronization signal of an input video signal, or a clock signal phase-synchronized with a color burst signal, is applied both as a sampling clock input to the A/D converter 100 and a write clock (WCK) input to the FIFO memory 101 for time base correction. A read clock input (RCK) is applied to the FIFO memory 101, which read clock input (RCK) usually is supplied from a crystal oscillator. Minor time base errors are removed by writing into the FIFO memory 101 with the sampling clock signal being phase-synchronized with the input video signal and by reading with the read clock which has a very stable frequency. The average rate of the write clock (WCK) input taken over several scan lines is controlled to be the same as the average rate of the read clock input (RCK) over the same time period; in video tape machines this is customarily arranged for by controlling the speed of a capstan regulating the spooling of video tape between pay-out and take-up reels.

When a drop-out is generated, the drop-out correction unit 20 basically compensates the drop-out by replacing the present signal with signal from the immediately preceding scan line. Therefore, a delay circuit 102 is required for delaying the present signal by one horizontal scanning period, or providing 1H delay, so the present signal is available to compensate for drop-out occurring during the next scan line. Commonly, this delay circuit 102 is provided by a further line-storage memory, in addition to the line-storage memory used for time-base correction. In other words, the reproduction error correction circuit for a conventional video reproduction system uses both a FIFO memory and a 1H delay line, each of which takes up considerable area on an integrated-circuit die and consumes an appreciable amount of electrical power. The consumption of electrical power increases the amount of heat that must be dissipated from the integrated circuit in order not to overheat its components.

SUMMARY OF THE INVENTION

The invention in an important one of its aspects is directed to a reproduction error correction circuit for a video reproduction system in which the FIFO memory and a 1H delay line that are separate elements in prior art apparatus are replaced by a single line-storage memory operated to provide both for time-base correction and for drop-out compensation. This has the advantages of reducing the area the reproduction error correction circuit takes up on an integrated-circuit die and reducing the consumption of electrical power by the reproduction error correction circuit. The single line-storage memory is cyclically supplied sequential write addresses descriptive of picture element (pixel) locations along a horizontal scan line, which write addresses are supplied at a rate that tracks any jitter in the input video signal selectively used for writing over the previous contents of the memory. The single line-storage memory is cyclically supplied sequential read addresses descriptive of picture element (pixel) locations along a horizontal scan line that are offset by about one-half scan line from the locations specified by the write addresses, the read addresses being supplied at a stable rate equal to an average over several scan lines of the rate at which write addresses are supplied. This provides for time-base error correction. When a drop-out is detected, overwriting of video signal samples already stored in the single line-storage memory is prohibited. This type of overwrite protection implements automatic replacement of the video signal during periods when drop-out is detected. The replacement video signal is generated from corresponding video signal in the 1H interval before the drop-out initially occurs. In the case of NTSC composite video signals, the luminance portion of the replacement signal is the same as the luminance portion of that corresponding video signal; the phase of the chrominance subcarrier of that corresponding video signal is reversed in the replacement signal when replacing a current video signal that is an odd number of lines more recent than that corresponding video signal; and the phase of the chrominance subcarrier of that corresponding video signal is retained in the replacement signal when replacing current video an even number of lines more recent than that corresponding video signal.

In preferred embodiments of the invention, the number of scan lines back from which the replacement signal is taken is determined from a modular count of the number of scan line periods a drop-out has persisted. This avoids having to append a modular line count to the video samples stored in the single line-storage memory, in order to specify the phase of the chrominance signal component of those samples as referenced to scan line beginning.

BRIEF DESCRIPTION OF THE DRAWINGS

The above objects and advantages of the present invention will become more apparent by describing in detail a preferred embodiment thereof with reference to the attached drawings in which:

FIG. 2 is a block diagram of the reproduction error correction circuit for the image reproduction system according to the present invention;

FIG. 4 is a waveform diagram of the output signal of the chrominance signal phase controlling means according to the present invention;

FIG. 5 is a block diagram of the chrominance signal phase inverting means for the reproduction error correction circuit according to an embodiment of the present invention;

FIG. 6A, 6B and 6C are waveform diagrams of various parts of the chrominance signal phase inverting means according to the present invention.

DETAILED DESCRIPTION OF THE DRAWINGS

Figure 1:
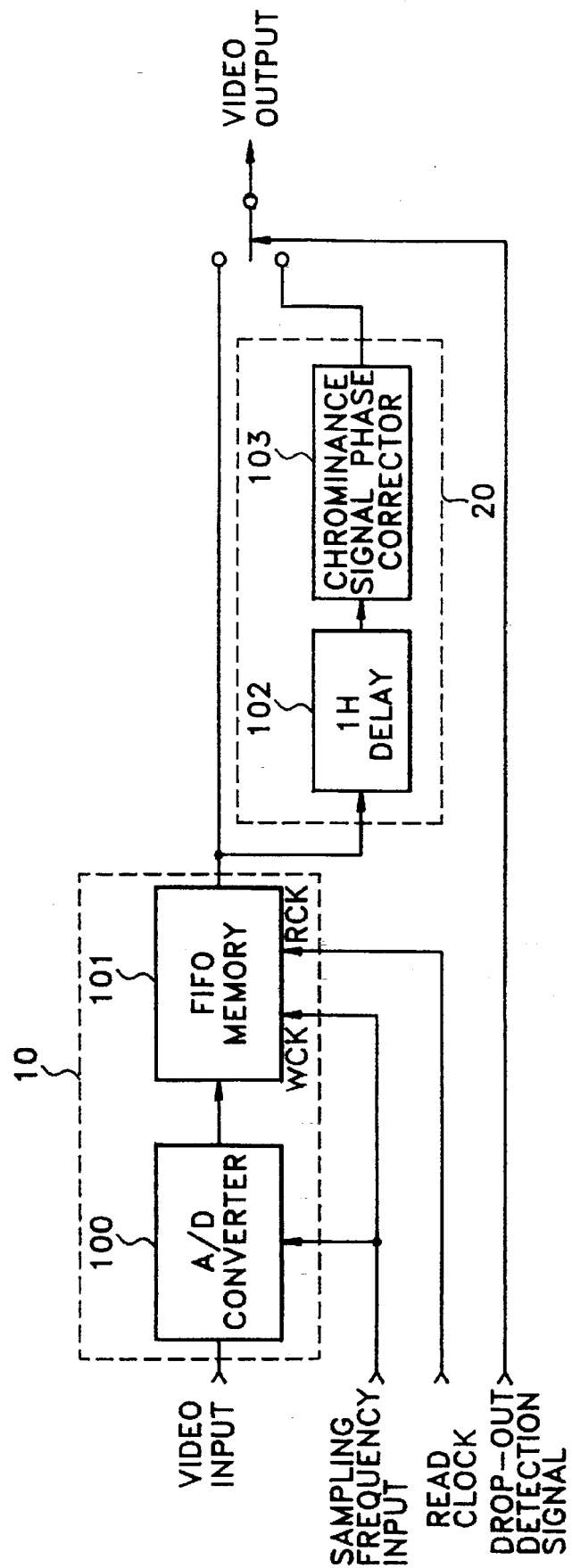
FIG. 1 is a block diagram of the reproduction error correction circuit for a prior-art image reproduction system.

Reproduction error circuitry for an image reproduction system, which circuitry embodies the present invention, will be described, following, with reference to FIGS. 2–7 of the accompanying drawings.

In FIG. 2, the reproduction error correction circuit includes a time base error correcting unit 30 and a drop-out compensating unit 40. The time base error correcting unit 30 comprises an analog-to-digital converter 200 and a 1H line memory 201. The drop-out compensating unit 40 comprises a chrominance signal phase inverter 202, a multiplexer 203, a write address generator 204, a read address generator 205, and a chrominance signal phase controller 206.

The sampling frequency input is supplied to the analog-to-digital converter 200 as a sampling clock and to the 1H line memory 201 as a write clock. This sampling frequency input closely tracks any jitter in the input video signal, having been phase-synchronized to the horizontal synchronization signal or the color burst signal component of the input video signal. The read clock for the memory has a constant frequency and is usually generated from a crystal oscillator, per conventional practice for time-base-error correction circuitry. The error with respect to time base is corrected by reading with the stable read clock while writing into the 1H line memory 201 in accordance with the sampling frequency input that closely tracks the jitter of the input video signal. Within the 1H line memory 201 the reading of storage locations is arranged to take place with an offset from their being written, which offset averages about one-half scan line. In this embodiment, the input video signal represents an NTSC composite video signal.

When drop-out occurs, a drop-out detection signal indicating the occurrence of the drop-out is input to the 1H line memory 201 and to the chrominance signal phase controller 206. This drop-out detection signal can be developed by an a drop-out detector responding to the disappearance of a modulated carrier which is detected to recover the video input signal; in an analog video tape recorder the amplitude of a carrier frequency-modulated by the luminance signal portion of the video signal can be sensed by a drop-out detector, by way of example. In a digital video recorder the drop-out detection signal can be developed by an a drop-out detector responding to the disappearance of normal digital coding conditions, by way of counter-example.

In the FIG. 2 reproduction error correction circuit the drop-out detection signal functions as an overwrite-protection signal in the 1H line memory 201. That is to say, when a drop-out occurs, causing the drop-out detection signal to be generated, overwrite protection is provided for the write address range of the 1H line memory 201 that corresponds to the segment of scan during which the drop-out detection signal is generated. If the 1H line memory 201 is of a type requiring a write enabling signal, the write enabling signal required for writing over of the previous contents stored in the 1H line memory 201 is withheld, in order to provide the overwrite protection that preserves the video signal samples written in an earlier scan line. The data in fie address range provided the overwrite protection are preserved, even though write addresses continue to be sequentially generated within the 1H line memory 201. The address offsets of the read address and write address maintain a scanning period of about 1H/2 on the average, 1H/2 being a time period one-half as long as the time 1H for scanning a horizontal line. However, the address offsets vary continually, depending on the jitter of the input video signal. During the time overwrite is prohibited in response to the drop-out detection signal, when the read address following with about 1H/2 address offset accesses the write-protected address range, the video signal simples written into the 1H line memory 201 during a previous scan line and preserved by overwrite protection are read from the 1H line memory 201. So, the segment of the screen where the drop-out would otherwise be evident is provided with video signal from a horizontal scanning line previous to the current one, automatically providing drop-out compensation. However, standard practice is that the phase of the color subcarrier for chrominance modulation changes from line to line, as referred to the beginning of each scan line. In the case of an NTSC signal, since there is an odd number of half cycles of chroma subcarrier in each 1H period, the spatial phase of the color subcarrier is offset 180° for each successive line. Accordingly, when composite video signal from an earlier scanning line substituted for composite video signal from a later scanning line, correction of color subcarrier phasing for the chrominance signal is often necessary, at least for a portion or portions of the drop-out generation period.

Figure 3A:
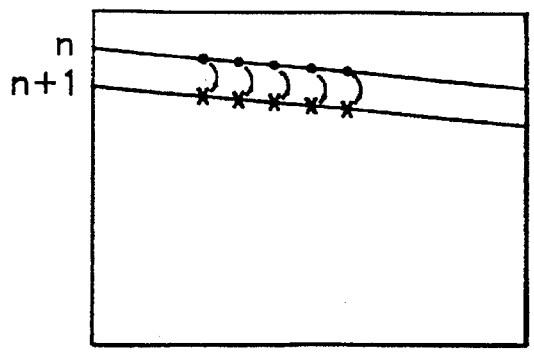
FIGS. 3A, 3B and 3C illustrate phase correction of the chrominance subcarrier by the reproduction error correction circuit according to the present invention.
Figure 3B:
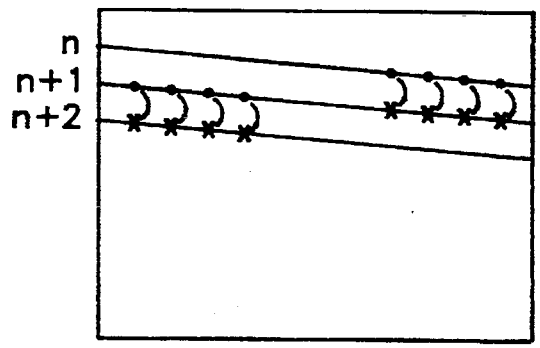
Figure 3C:
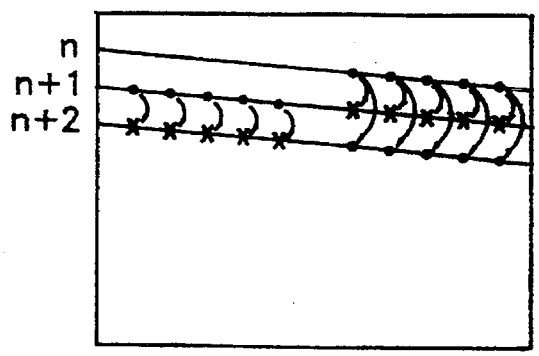

FIGS. 3A, 3B and 3C illustrate phase correction of the color, or chrominance, subcarrier. FIG. 3A illustrates phase correction when a drop-out is generated within a horizontal scanning line n+1. FIG. 3B illustrates phase correction when a drop-out in consecutive horizontal scanning lines n+1 and n+2 is shorter than 1H, the duration of a horizontal scanning line, so drop-out compensating signal can be extracted from the scanning lines n and n+1 at times one scan line period earlier than those times during which drop-out occurs. FIG. 3C illustrates phase correction in the case where a drop-out in consecutive horizontal scanning lines n+1 and n+2 is longer than the duration of one horizontal scanning line, requiring the drop-out compensating signal to be extracted from a scanning line two previous to one in which drop-out occurs, after the duration of the drop-out exceeds the duration of one entire horizontal scanning line.

FIGS. 3A and 3B illustrate conditions in which drop-outs have respective durations each no longer than the duration of a single horizontal scanning line. To compensate for the drop-outs, the video signal of a current scanning line is replaced with the previous scanning line, but with the phase of the chrominance subcarrier of the previous scanning line berg inverted in the replacement signal. FIG. 3C illustrates conditions in which the duration of the drop-out is longer period than the duration of a single horizontal scan line. In such case, from the initial point of the drop-out until a point one horizontal scanning period later, current video signal is replaced with video signal from one horizontal scanning line time earlier, with the phase of the color subcarrier of the earlier video signal being inverted in the replacement signal. One horizontal scanning period after the initial point of the drop-out, the current video signal perforce is replaced in part with video signal from two horizontal scanning lines earlier, the original phase of the color subcarrier being retained in this portion of the replacement signal. More generally, during drop-out periods, the video signal is replaced with corresponding video signal in the 1H interval before the drop-out initially occurs, the phase of the chrominance subcarrier of that corresponding video signal being reversed when it replaces current video an odd number of lines more recent (e.g., one line newer) and the phase of the chrominance subcarrier of that corresponding video signal being retained when it replaces current video an even number of lines more recent (e.g., two lines newer).

In FIG. 2 the chrominance signal phase inverter 202 responds to delayed video signal from the 1H line memory 201 with a response to the delayed video signal in which the phase of the chrominance subcarrier is inverted. The selection of either phase inversion or phase retention is performed by the multiplexer 203 and the control signal for such selection is generated from the chrominance signal phase controller 206. The chrominance signal phase controller 206 controls the phase of the color subcarrier such that color reproduction is properly performed with respect to the cases shown in FIGS. 3A, 3B and 3C. For this purpose, the chrominance signal phase controller 206 receives a write address, a read address and a drop-out detection signal.

The basic principle of the chrominance signal phase controller 206 will now be explained. First, the write address of the starting and finishing points of a drop-out interval is stored in an internal register of the chrominance signal phase controller 206. Then, when the read address following with the period of about 1H/2 matches the write address of the drop-out starting point, the output signal of the chrominance signal phase controller 206 is forced to be "high" level, conditioning the multiplexer 203 to select as a video output signal therefrom video signal supplied from the chrominance signal phase inverter 202, in which video signal the color subcarrier has been phase-inverted. Thereafter, when the read addresses are continuously counted to match the write address of the drop-out finishing point, the output signal of the chrominance signal phase controller 206 is forced to be "low" level, conditioning the multiplexer 203 to select as a video output signal therefrom video signal supplied directly from the 1H line memory 201, in which video signal the color subcarrier retains the original phase of the delayed video signal from the 1H line memory 201.

When the drop-out extends for a duration longer than one 1H time period, the output signal of the chrominance signal phase controller 206 inverts logic state every 1H time period following initial drop-out, and returns to a logic "low" when the read address matches the write address of the &op-out finishing point, if not already at the logic "low" when the read address matches the write address of the drop-out finishing point.

FIG. 4 shows an exemplary case wherein the drop-out period persists for more than 2H scanning periods but less than 3H scanning periods and illustrates a waveform diagram of the output signal of the chrominance signal phase controller 206. In FIG. 4, the point marked "$t_1$" represents the point when the read address matches the write address of the drop-out starting point, and the point marked "$t_2$" represents the point when the read address matches the write address of the drop-out finishing point.

FIG. 5 is a block diagram of a representative embodiment of the chrominance signal phase inverter 202, which comprises a bandpass filter 400, a multiplier 401 and a subtracter 402. The block diagram is somewhat simplified for purposes of explanation. As one familiar with the art of filter design will discern, the bandpass filter 400, which is generally a linear-phase finite-impulse-response (FIR) digital filter, in actual practice exhibits a transfer delay or latency in its response, which is applied to the subtrahend input of the subtracter 402 after its amplitude is doubled by the multiplier 401. In actual practice this delay should be compensated for by introducing similar delay into the input signal applied to the minuend input of the subtracter 402. The means for introducing this similar delay into the input signal applied to the minuend input of the subtracter 402 is not explicitly shown in FIG. 5, but is customarily provided for by a tapped delay line included as a component of the bandpass filter 400, when realized as an FIR digital filter.

FIGS. 6A, 6B and 6C will also be referred to in the following description of the operation of the FIG. 5 chrominance signal phase inverter. A composite video signal supplied to the minuend input of the subtracter 402 includes a chrominance signal component, the waveform of which is shown in FIG. 6A, which chrominance signal component is filtered from the composite video signal by the bandpass filter 400. An unchanging chrominance signal that corresponds to color subcarrier in phase is presumed for purposes of explanation. (One could alternatively consider FIGS. 6A-6C to show portions of the color burst interval.) The bandpass filter 400 response of FIG. 6A is doubled in amplitude by the multiplier 401, which outputs a signal the waveform of which is shown in FIG. 6B. The multiplier 401 can simply consist of a wired one-bit shift towards greater significance. The signal of FIG. 6B is subtracted from the signal of FIG. 6A by the subtracter 402, which outputs a composite video signal including a chrominance signal component. The waveform of this chrominance signal component, or corrected-chrominance-phase signal, is shown in FIG. 6C. In this manner, the phase of the color subcarrier of the chrominance signal component is inverted. One smiled in the art and provided the foregoing explanation will understand that the inversion of color subcarrier phase obtains, no matter what the instantaneous phase and amplitude variations of the chrominance signal component are.

Figure 7:
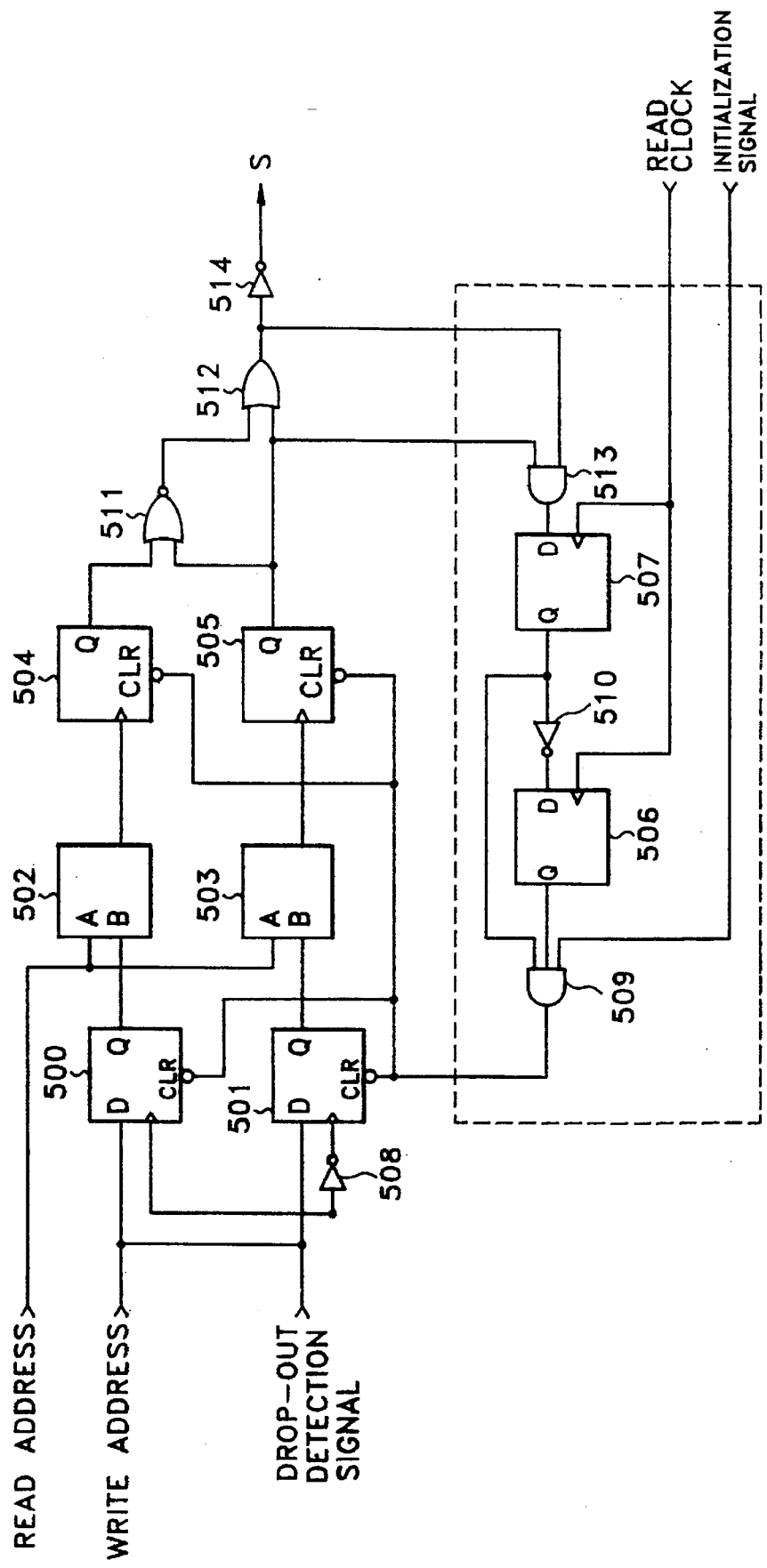
FIG. 7 is a circuit diagram of the chrominance signal phase controlling means according to an embodiment of the present invention.

FIG. 7 is a circuit diagram of the chrominance signal phase controller for a video reproduction system. In FIG. 7, the chrominance signal phase controller 206 comprises flip-flops 500, 501, 504, 505, 506 and 507, comparators 502 and 503, logic inverters 508, 510 and 514, AND gates 509 and 513, a NOR gate 511, and an OR gate 512. The flip-flops 500 and 501 are data or D flip-flops each representative of a respective bank of such flip-flops; the flip-flops 504 and 505 are triggered or T flip-flops; and the flip-flops 506 and 507 are data or D flip-flops used as respective bit latches. In certain of the claims that follow this specification, the flip-flops 504 and 505 are referred to as first toggling means and second toggling means, respectively; and the NOR gate 511, the OR gate 512, and the logic inverter 514 are referred to as gating means for performing an AND operation on the Q output signal of said first toggling means and the logic complement of the Q output signal of said second toggling means.

An initialization signal is generated once in the initial state of the system operation. While the initialization signal is "low," outputs of the flip-flops 500 and 501 are all "high" and those of the flip-flops 504 and 505 are cleared and go "low," thereby initializing the circuit. Here, although as many D flip-flops as write address bits are connected in parallel, only single D flip-flops 500 are 501 are shown in FIG. 7. In order to prevent the outputs of the comparators 502 and 503 from being generated in the blocks where the drop-out detection signal is not generated, the outputs of flip-flops 500 and 501 are set as values beyond the memory address. For example, when analog and digital sampling frequency is set as $4f_{sc}$ by the time base error corrector, where $f_{sc}$ the frequency of the color carrier, the number of samples for a 1H scanning period is 910 and thus the address range is 0 to 909. At this time, in order for the flip-flops 500 and 501 to latch each address value 0~909, the flip-flops 500 and 501 should each be 10-bit flip-flops. If the ten bits are all set, with an address value of 1023, which is beyond the address range, the comparison result of the comparators 502 and 503 is not generated unless a drop-out detection signal is input. Therefore, the output of the flip-flops 504 and 505 maintain the initial, cleared state, the output of the chrominance signal phase controller 206 stays "low," and the video signal which does not have its chrominance signal inverted in phase is selected as video output signal by the multiplexer 203 shown in FIG. 2.

The positive-going edge of the drop-out detection signal represents a drop-out starting point and the negative-going edge thereof represents a drop-out finishing point. The write address of the drop-out starting point is latched to the flip-flop 500 at the positive-going edge, and the write address of the drop-out finishing point is latched to the flip-flop 501 at the negative-going edge. When the drop-out detection signal is generated, the chrominance signal phase controller 206 operates as follows. The read address following the write address with about 1H/2 address offset is first compared with the write address of the drop-out starting point which is stored in the flip-flop 500 until the read address matches the write address, so that a "high" is output from the comparator 502. Then, the output of the comparator 502 functions as the clock of flip-flop 504, to change 504 output from "low" to "high", which conditions the output signal of the NOR gate 511 to go "low". At this time, the output of the flip-flop 505 still maintains a logic "low" level. The or gate 511 responds with a logic "low" to the logic "low" levels it receives from the NOR gate 511 and the flip-flop 505, thereby conditioning the logic inverter 514 to supply an output signal S from the chrominance signal phase controller 206, which output signal is a logic "high" level that conditions the chrominance signal phase inverter 202 to invert the chrominance signal phase.

Thereafter, if the drop-out period finishes within a 1H scanning period, at the time when the read address matches the write address of the drop-out finishing point, the output of the flip-flop 505 is toggled from "low" to "high", to which the OR gate 511 responds with a logic "high" that conditions the logic inverter 514 to supply an output signal S that is at a logic "low" level. This causes the chrominance signal phase inverter 202 no longer to invert the chrominance signal phase.

Alternatively, if the drop-out period extends longer than a 1H scanning period, whenever the read address matches the write address of the drop-out starting point, the output of the T flip-flop 504 changes logic condition responsive to a trigger signal supplied by the comparator 502. This change in the logic state of the flip-flop 504 while the output of the flip-flop 505 remains "low" causes change in the logic state of the NOR gate 511 response, in turn causing change in the logic state of the OR gate 512 response. The changing logic states of the OR gate 512 response appear in complemented form in the output signal S supplied from the logic inverter 514. Thereafter, when the write address of the drop-out finishing point matches the read address, the output of the flip-flop 505 is toggled from "low" to "high", thence to return the output signal S to a logic "high" level, irrespective of the output state of the flip-flop 504, and thereby terminate one cycle of the drop-out compensation.

The reset signal generator enclosed within dashed line in FIG. 7 is a circuit for generating a reset signal that resets the outputs of the flip-flops 500 and 501 to out-of-range addresses at termination of a drop-out compensation, that is, at the time when the read address matches the write address of the drop-out finishing point, and clears the flip-flops 504 and 505. The reset signal generator generates a reset pulse having a logic "low" block of one cycle of the read address clock signal as the output of the AND gate 509, by detecting the positive-going edge when the output of the flip-flop 505 is toggled from "low" to "high. This positive-going edge is detected by a positive edge detector comprising an inverter 510, a flip-flop 507 and an AND gate 513. The AND gate 513 is connected to respond to the output of the flip-flop 505 changing from "low" to "high," to force the outputs of the flip-flops 500 and 501 to "high" levels and to force the outputs of the flip-flops 504 and 505 to "low" levels, thereby returning the chrominance signal phase controller 206 to the initial state.

An important thing to understand about the FIG. 7 chrominance signal phase controller is that it is a modulo-two counter counting at scan line rate, the scan line count being reset to one at the starting point of the drop-out detection signal. This counter keeps track of from how many lines back the video signal samples used for generating the replacement signal are taken. This avoids any need for storing scan line number information with the temporarily video signal samples in order to determine how many lines back preserved video signal samples originated, which helps keep down the number of bits that have to be stored by the 1H line memory 201. The counting of lines is done using modulo-two numbers because two alternative color subcarrier phasings as referenced to beginning of scan line cyclically occur in successive horizontal scan lines. In embodiments of the invention in which a greater number of color subcarrier phasings as referenced to beginning of scan line cyclically occur in successive horizontal scan lines (e.g., four phasings of color-under signal in analog video tape recording), the modular counting of scan lines is done using that greater number as the modulus.

One smiled in the art will by acquaintance with the foregoing specification and accompanying drawing be empowered to design other embodiments of the invention; this should be taken into account when considering the scope of the claims appended to this specification. For example, the chrominance signal phase inverter 202 can be replaced by circuitry that separates the luminance and chrominance components of the video signal supplied from the 1H line memory 201, selectively inverts the separated chrominance component under the control of the chrominance signal phase controller 206, and combines the selectively inverted separated chrominance component with the separated luminance signal component to generate the video output signal. Embodiments of the invention suitable for use with composite video signals with modifications suiting those embodiments for use with broadcast standards other than NTSC (e.g., PAL or SECAM) or for use in video tape recording can also be designed using the general principles taught in this specification and its accompanying drawing. In such a design the chrominance signal phase inverter is replaced with circuitry for selectively changing, from between or among the cyclically occurring different phasings of color carrier as referenced to beginnings of scan lines, the phase of the chrominance portion of the video signal read from the 1H line memory 201, which circuitry for selectively changing is of a type that is apt to have to be modified in its design somewhat compared to the types described above.

What is claimed is:

1. A reproduction error correction circuit for a video reproduction system; which system includes a write clock signal generator for generating a write clock signal that tracks any jitter in an input video signal but does not automatically change phase at scan line rate, a read clock generator for generating a stable read clock signal, and a drop-out detector for generating a drop-out detection signal whenever drop-out occurs in said input video signal; said reproduction error correction circuit for generating a time-base-corrected output video signal, which said output video signal is responsive to said input video signal except whenever a drop-out detection signal occurs and is then provided drop-out compensation; said reproduction error correction circuit comprising:

memory for storing image data of one horizontal scanning period, provided with an input port for receiving said input video signal as digitized in response to said write clock signal, operated for selectively writing current input video signal over previously stored input video signal at corresponding horizontal scan position, and provided with an output port for supplying an output video signal corresponding to portions of said input video signal stored in said memory, said memory being written only when said drop-out detector determines there is no drop-out in said current input video signal;

a write address generator for generating, in a prescribed sequence, write addresses for said memory at a rate responsive to said write clock signal;

a read address generator for generating, in said prescribed sequence, read addresses for said memory at a rate responsive to said read clock signal, said read addresses corresponding to write addresses generated a portion of a line scanning period earlier;

circuitry for separating the chrominance portion of composite video signal read from said memory via its output port from the luminance portion of said composite video signal;

circuitry for selectively changing, between first and second color subcarrier phases, the phase of the chrominance portion of the composite video signal read from said memory via its output port, thereby to generate a corrected-chrominance-phase signal;

circuitry for combining said corrected-chrominance-phase signal with the luminance portion of the composite video signal read from said memory via its output port, thereby to generate said time-base-corrected output video signal; and a chrominance signal phase controller for controlling the selection of the phase of said corrected-chrominance-phase signal in accordance with the number of horizontal scanning periods a drop-out condition has continued at the horizontal scan position corresponding to that of the composite video signal read from said memory via its output port, said number of horizontal scanning periods a drop-out condition has continued being determined within said chrominance signal phase controller in response to said drop-out detecting signal, said read address signal and said write address signal.

2. A reproduction error correction circuit as set forth in claim 1, wherein said read clock generator generates a read clock signal that does not change phase from scan line to scan line.

3. A reproduction error correction circuit as set forth in claims 1, wherein said read address generator generates read addresses at a rate that does not change phase from scan line to scan line.

4. A reproduction error correction circuit for a video reproduction system; which system includes a write clock signal generator for generating a write clock signal that tracks any jitter in an input video signal but does not automatically change phase at scan line rate, a read clock generator for generating a stable read clock signal, and a drop-out detector for generating a drop-out detection signal whenever drop-out occurs in said input video signal; said reproduction error correction circuit for generating a time-base-corrected output video signal, which said output video signal is responsive to said input video signal except whenever a drop-out detection signal occurs and is then provided drop-out compensation; said reproduction error correction circuit comprising:

memory with storage capability for one horizontal scan line of composite video signal and not for a further horizontal scan line of composite video signal, said memory being the sole memory for storing image data included within said reproduction error correction circuit, being disabled for writing whenever a drop-out detection signal occurs, being provided with an input port for receiving said input video signal as digitized in response to said write clock signal, and being provided with an output port;

a write address generator for generating, in a prescribed sequence, write addresses for said memory at a rate responsive to said write clock signal;

a read address generator for generating, in said prescribed sequence, read addresses for said memory at a rate responsive to said read clock signal, said read addresses corresponding to write addresses generated a portion of a line scanning period earlier;

circuitry for separating the chrominance portion of composite video signal read from said memory via its output port from the luminance portion of said composite video signal;

circuitry for selectively changing, between first and second color subcarrier phases, the phase of the chrominance portion of the composite video signal read from said memory via its output port, thereby to generate a corrected-chrominance-phase signal;

circuitry for combining said corrected-chrominance-phase signal with the luminance portion of the composite video signal read from said memory via its output port, thereby to generate said time-base-corrected output video signal; and a chrominance signal phase controller for controlling the selection of the phase of said corrected-chrominance-phase signal in accordance with the number of horizontal scanning periods a drop-out condition has continued at the horizontal scan position corresponding to that of the composite video signal read from said memory via its output port, said number of horizontal scanning periods a drop-out condition has continued being determined within said chrominance signal phase controller in response to said drop-out detecting signal, said read address signal and said write address signal.

5. A reproduction error correction circuit as set forth in claim 4, wherein said read clock generator generates a read clock signal that does not change phase from scan line to scan line.

6. A reproduction error correction circuit as set forth in claim 4, wherein said read address generator generates read addresses at a rate that does not change phase from scan line to scan line.

* * * * *